April 27, 1943. E. L. BAUER 2,317,580
COMPOSITE PISTON RING
Filed Jan. 6, 1940
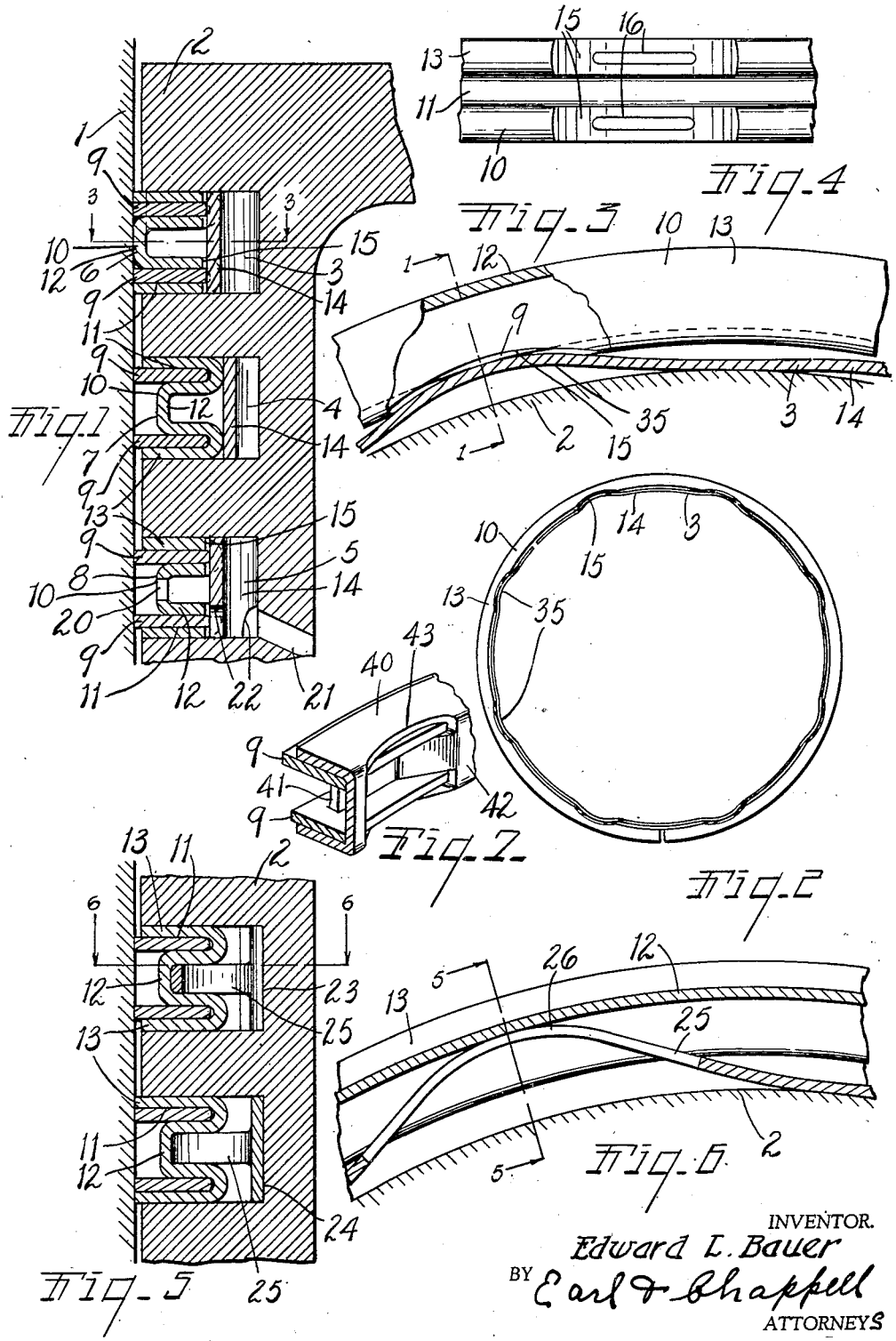
INVENTOR.
Edward L. Bauer
BY Earl & Chappell
ATTORNEYS Patented Apr. 27, 1943

2,317,580

UNITED STATES PATENT OFFICE 2,317,580

COMPOSITE PISTON RING

Edward L. Bauer, Hastings, Mich., assignor to Hastings Manufacturing Company, Hastings, Mich., a corporation of Michigan Application January 6, 1940, Serial No. 312,733

5 Claims. (Cl. 309—45)

This invention relates to improvements in composite piston rings.

The main objects of this invention are:

First, to provide a novel composite piston ring assembly particularly for internal combustion engines.

Second, to provide an assembly of the type described including as elements thereof cylinder wall engaging elements or sections of a relatively hard material, a ductile spacer and carrier therefor, and means for imparting effective radial outward thrust to said cylinder wall engaging elements.

Third, to provide a structure of the type described wherein the outward thrust or expander action is accomplished without undue wear and weakening of the less wear-resistant parts of the assembly.

Fourth, to provide an assembly of the type described including several elements all of which are capable of being manufactured, handled, and installed and of operating effectively without danger of breakage due to weakening of the parts for one reason or another.

Objects relating to details and economies of the invention will appear from the description to follow. The invention is defined in the claims.

Preferred embodiments of the invention are illustrated in the accompanying drawing, wherein:

Fig. 1 is an enlarged fragmentary view in vertical section on a line corresponding to line 1—1 of Fig. 3, illustrating a cylinder wall and piston coacting therewith, which piston has disposed in the grooves thereof piston ring assemblies in accordance with various embodiments of the invention.

Fig. 2 is a top plan view illustrating a piston ring assembly in accordance with a preferred embodiment of the invention.

Fig. 3 is a fragmentary view partially in section on line 3—3 of Fig. 1, further illustrating details of construction of an assembly in accordance with a preferred embodiment of the invention.

Fig. 4 is a fragmentary inside view illustrating the combined carrier and spacer element of the assembly in accordance with a preferred embodiment of the invention.

Fig. 5 is a view somewhat similar to Fig. 1, wherein the piston has other embodiments of my piston ring assembly disposed in the grooves thereof, this view being in section on a line corresponding to line 5—5 of Fig. 6.

Fig. 6 is a fragmentary view in section on line 6—6 of Fig. 5, illustrating details of construction.

Fig. 7 is a fragmentary perspective view in transverse section of still another embodiment or adaptation of the invention.

Referring to Fig. 1, I illustrate therein a cylinder wall 1 having a piston 2 reciprocable therein, this piston being provided with annular compression and scraping ring grooves 3, 4, respectively, and an oil groove 5 for receiving various embodiments of the piston ring assembly of the invention which for the purpose of clarity will be generally designated by the numerals 6, 7, 8, respectively. These several embodiments have certain important features in common and are therefore identified by similar reference numerals. For example, in each of the embodiments of Fig. 1, I illustrate a pair of thin, annular, ribbon-like, split cylinder wall engaging elements or segments 9 preferably of steel or other hard, wear-resistant material. These elements or segments are disposed in axially spaced relation with the edges thereof in engagement with the cylinder wall, being maintained in such relation by a combined carrier and spacer element 10 which is made from some ductile material such as brass formed to provide axially spaced horizontally disposed channels or grooves 11 opening outwardly and receiving the segments 9, and a medial U-shaped spacing portion 12. This combined carrier and spacer element is formed of a strip of material folded upon itself or rolled to provide a general W-shape resulting in the two outwardly facing channels, the central spacer portion and side flange portions, the sectional dimensions being such as to suitably fit in the cylinder groove with the desired clearance.

The foregoing assembly is completed by an inner expanding spring 14 which, as illustrated in the embodiments of Figs. 1 to 4, inclusive, is of the conventional generally polygonally spaced type having rounded portions 15 engageable with the piston ring and flat connecting reaches 16 engageable with the bottom of the groove.

In the embodiment of the assembly of my invention which is disposed in the uppermost or compression ring groove 3 of the piston, it will be observed that the upper and lower arms or flanges 13 of the carrier as well as the intermediate portion thereof extend all the way outwardly to the cylinder wall, engaging the latter along with the steel segments 9, so that an effective sealing is made possible, such as is necessary in a compression groove. Radial outward thrust is imparted to the steel elements 9 by spring 14. In order to enable this spring to act directly on the steel segments on the element 10 the inwardly facing bights are cut away as by milling or grinding at 15 providing openings 16 of considerable angular extent, see Fig. 4. This allows the spring to have a free radial action on the steel segments. In forming these notches and in positioning the assembly in the groove, the crimps 35 of the inner spring are disposed in angular registry with the notches, as illustrated in Fig. 3.

The structure just described is one which is exceedingly rugged although quite light in weight and is not likely to be broken in handling or installation.

I illustrate another embodiment of my invention in the groove 4 in Fig. 1. In this embodiment, the outward thrust of the expander 14 is delivered directly to the element 10 and transmitted thereby to the wall engaging segments 9. In this case, the flanges of the element 10 are not of such radial width as to constitute cylinder wall engaging elements as in the embodiment I have described, the element 10 in this case merely constituting a combined carrier and spacer.

In the embodiment of my invention shown in the groove 5 which embodiment is designated generally by the numeral 8, the flanges of the element 10 are not designed as wall contacting elements. The center portion 12 of the element 10 has oil drainage openings 20 therein. The element 10 is cut away at 15 as in the first described embodiment to permit the expander to act directly upon the steel segments. The piston groove 5 is provided with oil drainage openings 21. This embodiment is effective as an oil ring and the expander has openings 22 to permit the passage of the oil to the bottom of the groove.

In Figs. 5 and 6 I illustrate further modified embodiments of the assembly of my invention disposed in piston ring grooves identified by the reference numerals 23 and 24. These embodiments each include carrier elements conformed as described above, that in groove 23 having the upper and lower flanges 13 not engaging or contacting the cylinder wall while that in groove 24 corresponds in this respect to the assembly of groove 3, i. e., the reaches 13 as well as the steel segments engage the cylindrical wall. In this respect the formation of the carrier element is optional in any of the embodiments of my invention. In both forms shown in Figs. 5 and 6, steel cylinder wall engaging elements or segments are disposed in the horizontal outwardly opening grooves 11.

In the assemblies of Figs. 5 and 6, the radial expansive action is provided by an expanding spring which, although its overall axial dimension is substantially equal to that of the groove, has portions thereof cut away at the crimps as indicated by the reference numeral 25, to enable the spring to fit in the space provided by the U-shaped intermediate portion of the carrier, engaging the latter to urge the entire assembly outwardly. It will occur to those skilled in the art that the same purpose could be accomplished by the use of spring fingers or tongues outwardly offset from the plane of the expanding spring and I therefore desire that the portions 26 of reduced axial thickness to be considered as in effect the equivalent of such spring tongues or fingers.

In the embodiment of my invention shown in Fig. 7, the combined carrier and spacer element 40 is of channel cross section and has a plurality of tongue-like spacer portions 41 struck outwardly from the web 42 of the element, these spacer elements 41 lying between the cylinder wall contacting elements 9. The member 40 has recesses 43 formed therein to permit the inner ring or expander to engage the inner edges of the cylinder wall contacting elements, in this respect the action being substantially that of the embodiment of Figs. 1 to 4 inclusive.

In any of the foregoing embodiments, it will be obvious that certain changes in the engagement or lack of engagement of the carrier element with the cylinder wall can be effected. For example, the same may be extended at the upper land 13 for engagement with the cylinder wall and not at the lower corresponding land or vice versa. I consider such a concept to fall within the scope of my invention, although I have not particularly illustrated the same from a desire not to unduly complicate the disclosure.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. A piston ring assembly comprising a split expansible combined carrier and spacer element of relatively soft ductile material of a general W-section providing a pair of outwardly opening axially spaced cylinder wall contacting element receiving grooves, a pair of flange-like cylinder wall engaging side members, and a U-shaped intermediate spacer member also constituting a cylinder wall engaging element, the inwardly facing bights of said element being cut away at spaced intervals to provide openings to said grooves, a thin annular split expansible cylinder wall engaging element of hard wear-resisting material disposed in each of said grooves, and an expander engaging said last named cylinder wall engaging elements through said openings.

2. A piston ring assembly comprising a split expansible combined carrier and spacer element of relatively soft ductile material of a general W-section providing a pair of outwardly opening axially spaced cylinder wall contacting element receivng grooves, a pair of flange-like cylinder wall engaging side members, and a U-shaped intermediate spacer member also constituting a cylinder wall engaging element, and a thin annular split expansible cylinder wall engaging element of hard wear-resisting material disposed in each of said grooves.

3. A piston ring assembly comprising a split expansible combined carrier and spacer element of relatively soft ductile material of a general W-section providing a pair of outwardly opening axially spaced cylinder wall contacting element receiving grooves, a pair of flange-like cylinder wall engaging side members, and a U-shaped intermediate spacer member, the inwardly facing bights of said element having openings therein, an annular split expansible cylinder wall engaging element of hard wear-resisting material disposed in each of said grooves, and an expander engaging said last named cylinder wall engaging element through said openings.

4. A piston ring assembly comprising a split expansible combined carrier and spacer element of relatively soft ductile material of a general W-section providing a pair of outwardly opening axially spaced cylinder wall contacting element receiving grooves, a pair of flange-like cylinder wall engaging side members, and a U-shaped intermediate spacer member, and an annular split expansible cylinder wall engaging element of hard wear-resisting material disposed in each of said grooves.

5. A piston ring assembly comprising a split expansible combined carrier and spacer element of ductile material of a general W-section providing a pair of outwardly opening axially spaced cylinder wall contacting element receiving grooves of substantial radial depth, a pair of flange-like side members, and a U-shaped intermediate spacer member, the inwardly facing bights of said element having openings therein, an annular split expansible cylinder wall engaging element of wear-resisting material disposed in each of said grooves to project into said openings in said bights, and an expander engaging the portions of said cylinder wall engaging elements which project into said openings.

EDWARD L. BAUER.